(12) United States Patent
Sohara et al.

(10) Patent No.: US 6,992,416 B2
(45) Date of Patent: Jan. 31, 2006

(54) BEARING DEVICE (75) Inventors: Yoshitsugu Sohara, Tochigi (JP); Hiroshi Watanabe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/974,340

(22) Filed: Oct. 27, 2004

(65) Prior Publication Data
US 2005/0088051 A1 Apr. 28, 2005

(30) Foreign Application Priority Data
Oct. 28, 2003 (JP) ............................. 2003-366854

(51) Int. Cl.
*H02K 7/09* (2006.01)
(52) U.S. Cl. ..................................... 310/90.5
(58) Field of Classification Search ............... 310/90.5, 310/90, 112
See application file for complete search history.

(56) References Cited

U.S. PATENT DOCUMENTS 6,307,295 B1 * 10/2001 Murabe et al. ............ 310/90.5
6,442,857 B1 * 9/2002 Atsuhiko et al. ............ 33/553
6,617,734 B2 * 9/2003 Taniguchi et al. ......... 310/90.5

FOREIGN PATENT DOCUMENTS

JP 11-311511 11/1999

* cited by examiner

*Primary Examiner*—Darren Schuberg
*Assistant Examiner*—Nguyen N. Hanh
(74) *Attorney, Agent, or Firm*—Morgan & Finnegan LLP (57) ABSTRACT A rotor portion, which is supported rotatably with respect to a housing, rotates due to magnetic action with a magnet attached to the rotor portion by flowing electric current through an electromagnetic coil. Vibration of the rotor portion becomes large if centrifugal force is generated due to eccentricity or unbalance. Positional sensors detect the deviations. In order to eliminate the deviations, electric current flows through an electromagnetic coil, causing a force in a radial direction to act on the rotor portion. A bearing device capable of correcting minute shaft deviations is thus obtained.

2 Claims, 16 Drawing Sheets

BEARING DEVICE

BACKGROUND OF THE INVENTION

1. Field of the Invention

The present invention relates to a bearing device having a function of reducing axial runout in a fluid bearing of a general industrial machinery or the like.

2. Related Background Art

Spindle motors having enhanced bearing rigidity are known, parallel provided with magnetic bearings so as to strengthen the rigidity of an air fluid bearing portion of an air spindle motor as described in a document entitled "NTN Corporation Technical Review No. 69, Development of Magnetic aerostatic hybrid spindle."

Further, measures for accurately detecting rotor position and controlling roller posture while configuring a magnetic bearing have been proposed, as disclosed in Japanese Patent Application Laid-Open No. H11-311511. With a conventional technique proposed in the development of aerostatic hybrid spindle in the above document, deviations in a shaft surface processed with high precision are detected by a positional sensor, and control is performed so as to reduce the shaft deviations. However, extremely minute shaft deviations equal to or less than the surface roughness of the shaft fall within an error range, and there is a problem in that minute shaft deviations cannot be handled.

Further, with the magnetic bearing disclosed in Japanese Patent Application Laid-Open No. H11-311511, a shaft center position is detected directly by a scanning probe microscope that are disposed on both ends of the shaft, and the bearing itself is configured by magnetically coupling alone. Therefore, there is a problem in that the device itself becomes a large-scale device.

SUMMARY OF THE INVENTION

An object of the present invention is to provide a bearing device that detects minute shaft deviations and precisely controls the shaft deviations, thus resolving problems such as those described above.

To attain the above object, a bearing device includes: a stator portion that rotatably supports a rotor portion; a deviation detection unit that detects deviations of the rotor portion in a radial direction; and force generating means for imparting a force to the rotor portion in the radial direction, in which the force generating means is controlled based on output from the deviation detection unit so that the deviations of the rotor portion in the radial direction eliminates.

Further, with the bearing device according to the present invention, minute shaft deviations of the rotor portion are controlled and detected, whereby the shaft deviations can be controlled more precisely.

Furthermore, if the precise configuration of a measurement surface on a shaft side surface is measured and recorded in advance, minute deviations in the radial direction of the shaft of a magnitude equal to, or less than, the surface roughness thereof during actual operation can be detected, whereby precise control can be performed.

Additional objects and configurations relating to the present invention will become clear through explanations of embodiments described hereinafter.

DESCRIPTION OF THE PREFERRED EMBODIMENTS

Embodiment 1

Figure 1:
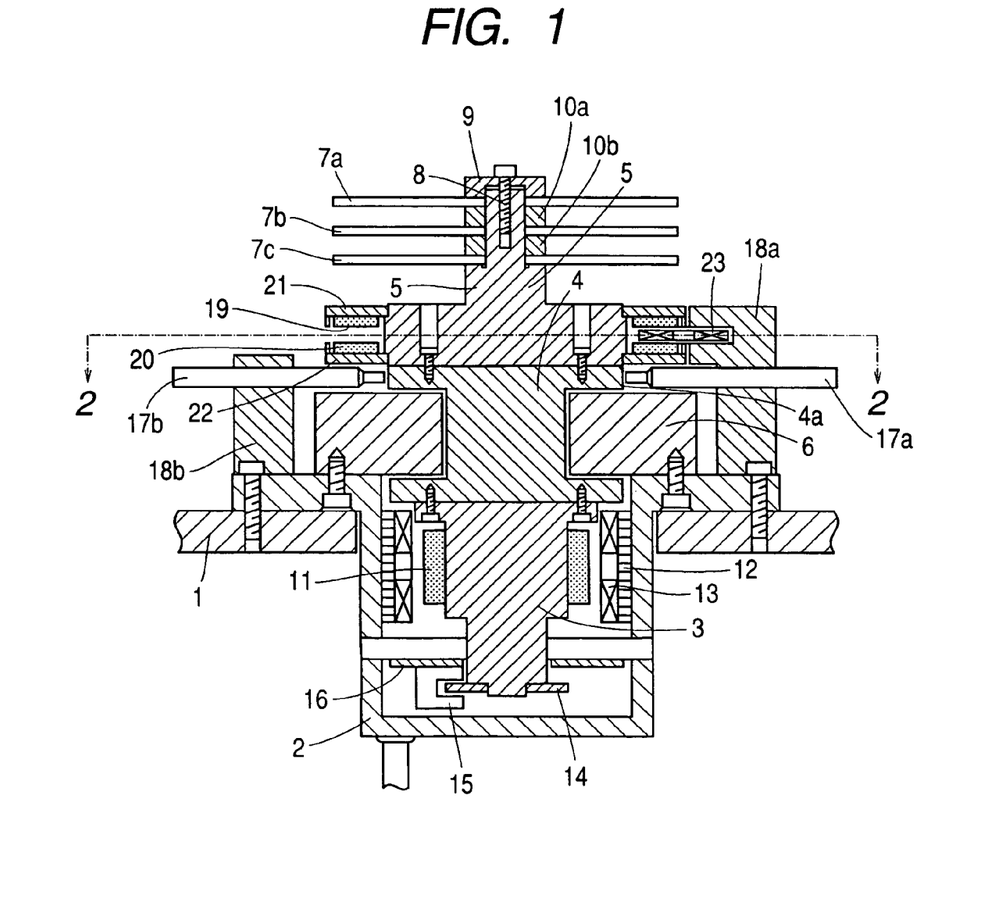
FIG. 1 is a cross sectional view of Embodiment 1 of the present invention.
Figure 2:
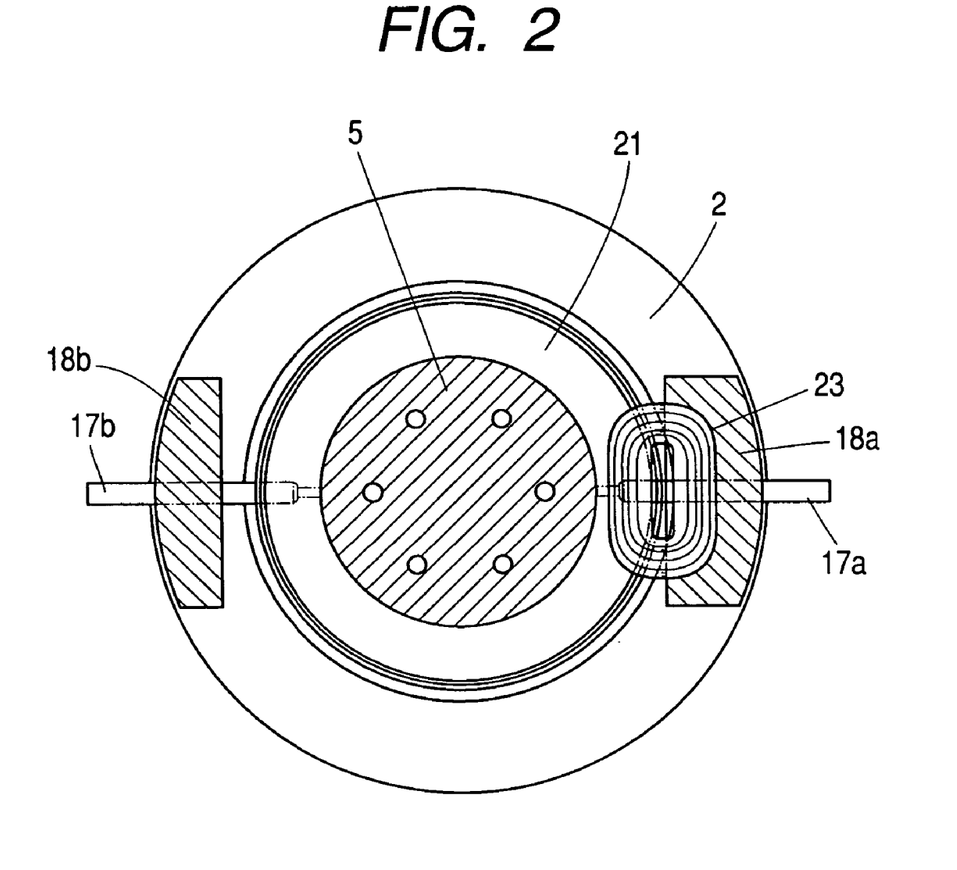
FIG. 2 is a cross sectional view taken along a line 2—2 of FIG. 1.

FIG. 1 is a cross sectional view of Embodiment 1 of the present invention as implemented in a spindle motor that uses a fluid bearing for an HDD servo writer, for example. FIG. 2 is a cross sectional view taken along a line 2—2 of FIG. 1. A rotor portion is housed in a housing 2 that is a stator portion fixed to an attachment plate 1. The rotor portion includes, in order from the bottom thereof, a rotation drive portion 3, a rotation center portion 4, and a hub 5 that are integrated by using a plurality of screws. An annular support portion 6 that is fixed to the housing 2 supports the rotation center portion 4. Disks 7a, 7b, and 7c used for a hard disk are integrally fixed to the hub 5 by a screw with a cap 9, and spacers 10a and 10b.

A magnet 11 used to generate torque is provided around the periphery of the rotation drive portion 3. Electromagnetic coils 13 provided through a stator core 12 are disposed on an inner side of the housing 2, opposing the magnet 11. The rotor portion rotates with respect to the stator portion by making electric current flow in the electromagnetic coils 13, thus functioning as a motor.

In addition, a chart 14 on which position signals are recorded is attached to a lower end of the rotation drive portion 3 in order to detect rotation angles. An encoder head 15 that detects the position signals of the chart 14 is fixed to the housing 2, through a circuit substrate 16, in the periphery of the chart 14.

On the other hand, a measurement surface 4a is provided in the periphery of the rotation center portion 4. The measurement surface 4a is machined such that its surface roughness, radial direction vibration, and its roundness are all on the order of 1 μm. Detection terminals of rod-shaped positional sensors 17a and 17b are disposed on the measurement surface 4a in positions 180° opposite to each other around the shaft center. The positional sensors 17a and 17b are respectively fixed to fixing portions 18a and 18b that are provided on the housing 2.

Further, annular magnets 19 and 20, which are magnetized to take on N and S polarities across the entire surfaces thereof, are supported by and integrally fixed to back yokes 21 and 22, respectively, in the circumference of a base portion of the hub 5. The magnets 19 and 20 oppose each other in an axially vertical direction, through an air gap. A magnetic field that is uniform in the axial direction is formed in the air gap between the magnets 19 and 20. In addition, a hollow-core electromagnetic coil 23 is fixed to an upper portion of the fixing portion 18a. The electromagnetic coil 23 has windings, approximately half of which are inserted within the air gap between the magnets 19 and 20.

The rotor portion, supported rotatably with respect to the housing 2; the support portion 6; and the fixing portions 18a and 18b, rotates with respect to the stator portion by magnetic action with the magnet 11 by flowing electric current through the electromagnetic coils 13. Deviations in the rotor portion due to vibration will be generated here if a centrifugal force is generated due to eccentricity of the disks 7a, 7b, and 7c, or due to an unbalance in other portions. By detecting the deviations using the positional sensors 17a and 17b, and by flowing electric current through the electromagnetic coil 23 to eliminate the deviations, a force is made to act in the radial direction as the windings cross the magnetic field between the magnets 19 and 20. The relative positions of the magnets 19 and 20 and the electromagnetic coil 23 change in order to balance the force.

According to Embodiment 1, the surface configuration of the measurement surface 4a of the rotation center portion 4 is accurately measured and recorded in advance. The positional sensors 17a and 17b are disposed in positions approximately 180° opposite to each other around the shaft center. Accordingly, changes in configuration due to thermal expansion of the bearing are detected. In addition, the amount of deviation of the rotation center portion 4 with respect to the positional sensors 17a and 17b can be accurately detected from output of the detected configuration change and from the configuration component of that potion.

The deviations detected by the positional sensors 17a and 17b can thus be compensated for, and rigidity can be positively increased by performing feedback control in which the magnitude and the direction of the electric current flowing in the electromagnetic coil 23 are changed in order to suppress the deviations.

Figure 3:
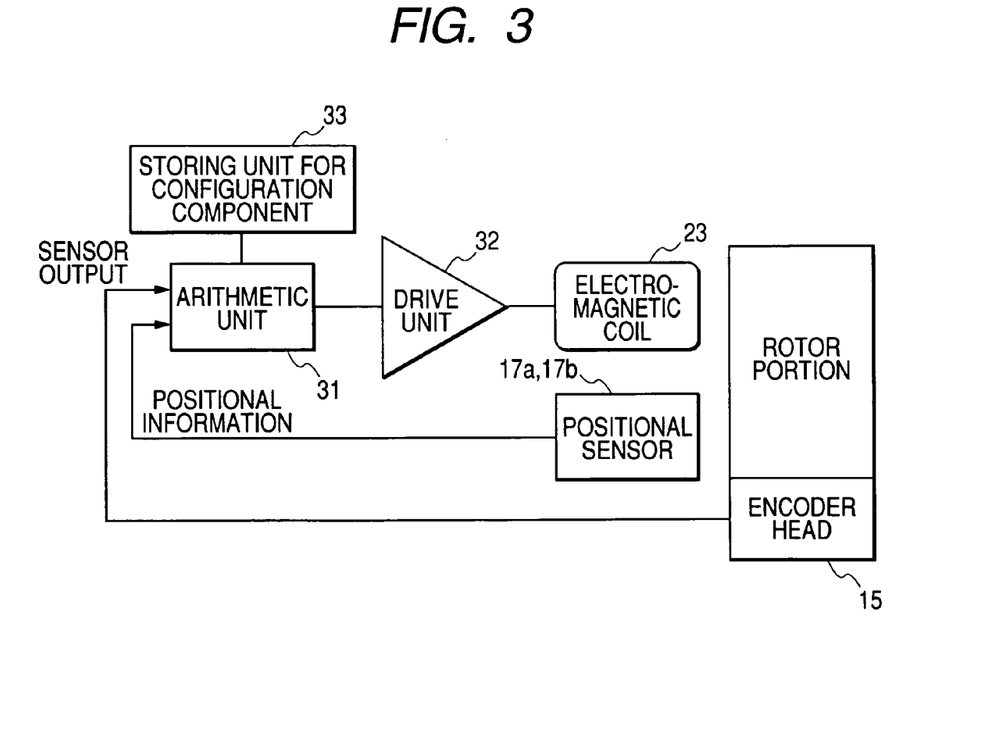
FIG. 3 is an electrical block diagram of a control unit.

FIG. 3 shows an electrical block diagram of a control portion. Outputs from the positional sensors 17a and 17b with respect to the rotor portion and output from the encoder head 15 are connected to an arithmetic unit 31. Output from the arithmetic unit 31 is connected to the electromagnetic coil 23 through a drive unit 32. The magnitude and direction of the electric current flowing through the electromagnetic coil 23 are thus controlled. Further, output from a storing unit for configuration component 33 is connected to the arithmetic unit 31.

The outputs from the positional sensors 17a and 17b and signals of the encoder head 15 are input to the arithmetic unit 31. The configuration components corresponding to the varying rotor portion positions obtained from the encoder head 15 can be found from information measured preciously in advance and stored in the storing unit for configuration component 33. Accordingly, the actual amount of movement of the rotor portion in the radial direction is computed by subtracting the configuration component from the outputs of the positional sensors 17a and 17b. The deviation signal is thus compensated for, and input to the drive unit 32.

For example, the positional sensors 17a and 17b used may be precision sensors that output 1 V analog voltage outputs at 2.5 μm displacements. Capacitance type sensors or laser interference type sensors may be employed. An A/D converter portion of an input portion of the arithmetic unit 31 can attain a resolution on the order of 12 bits, that is, 2.5 μm/4096=0.6 nm, for ±0.5 V inputs. The actual surface roughness of the measurement surface 4a also has similar values. True axial runout can be detected within a frequency bandwidth to be compensated for, and compensation can be performed.

Figure 4A:
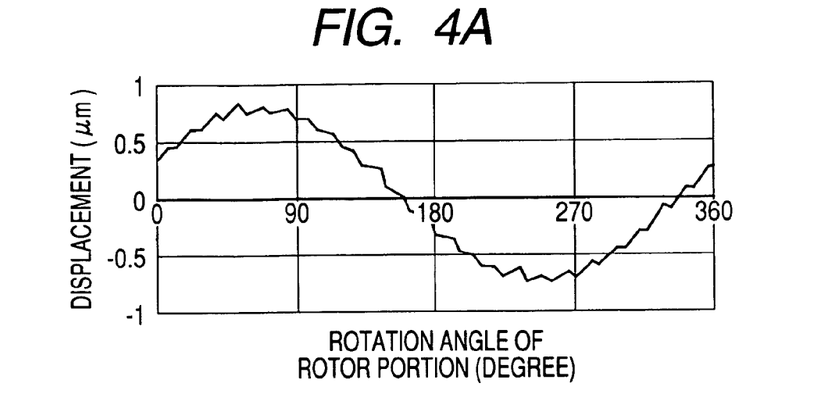
FIGS. 4A, 4B, and 4C are schematic diagrams of signals.
Figure 4B:
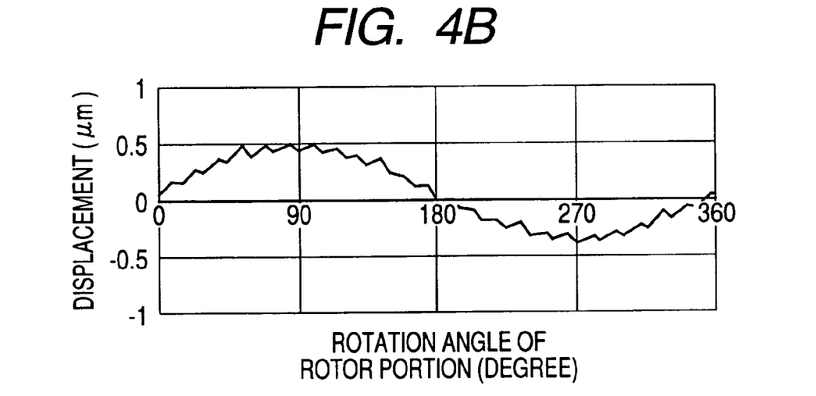
Figure 4C:
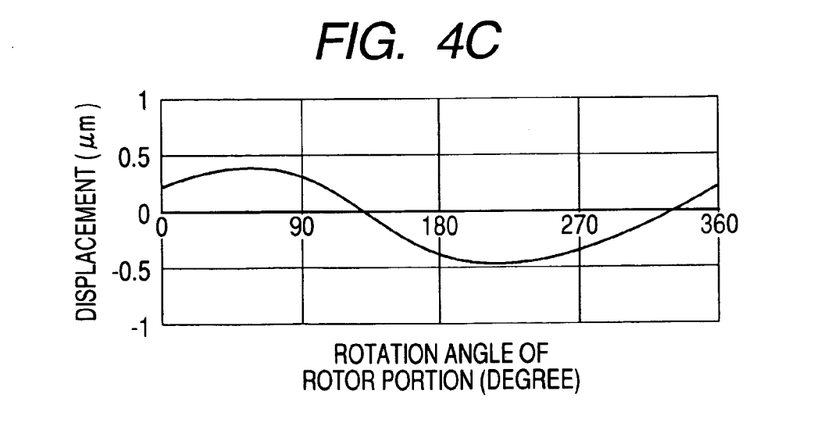

FIGS. 4A, 4B, and 4C conceptually illustrates respective signals on the block diagram of FIG. 3. The outputs of the positional sensors 17a and 17b of FIG. 4A show non-controlled outputs, and are vibration waveforms with respect to angle of the actual measurement surface 4a.

FIG. 4B shows stored configurations of the measurement surface 4a with respect to angle, and this information is stored in the storing unit for configuration component 33 of FIG. 3. FIG. 4C is a deviation waveform in an inner portion of the arithmetic unit 31 during non-control. The deviation signals approach zero by controlling outputs to the drive unit 32 so as to compensate for the deviation waveform.

Further, it is also possible to omit one of the magnets 20, and to form a similar configuration by using the back yoke 22. This case is equivalent to halving the magnet thickness.

Embodiment 2

Figure 5:
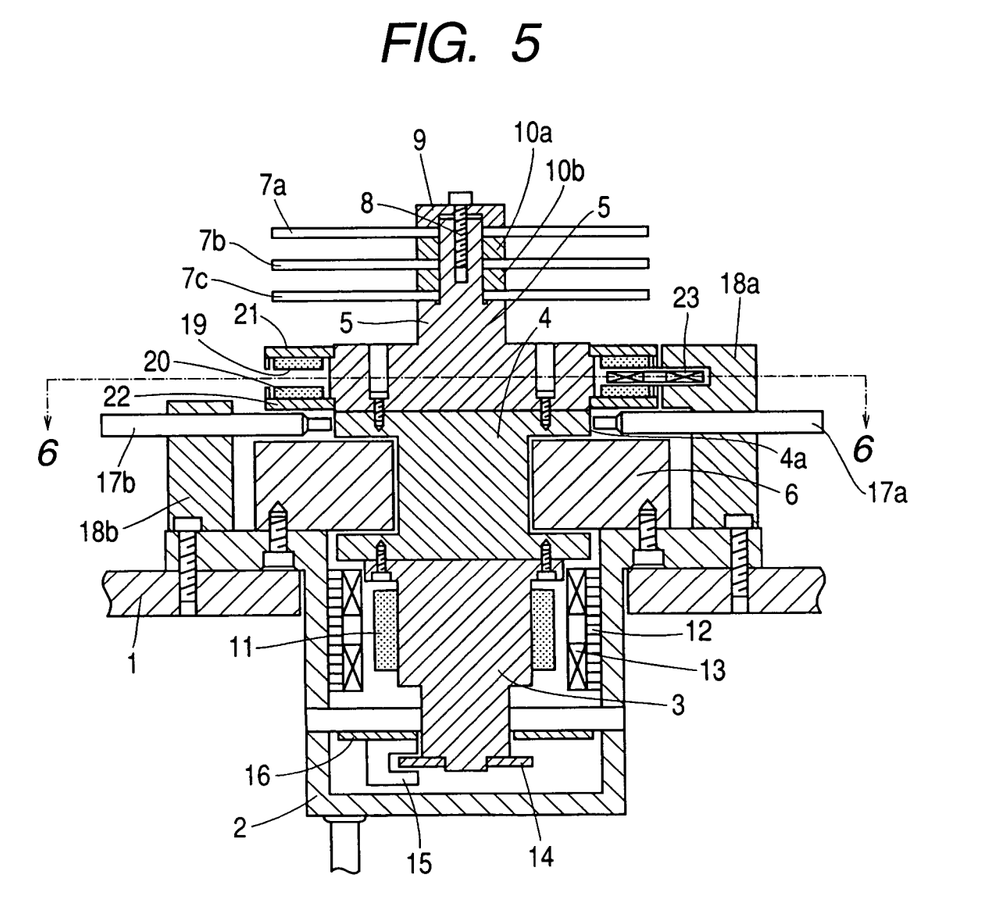
FIG. 5 is a cross sectional view of Embodiment 2 of the present invention.
Figure 6:
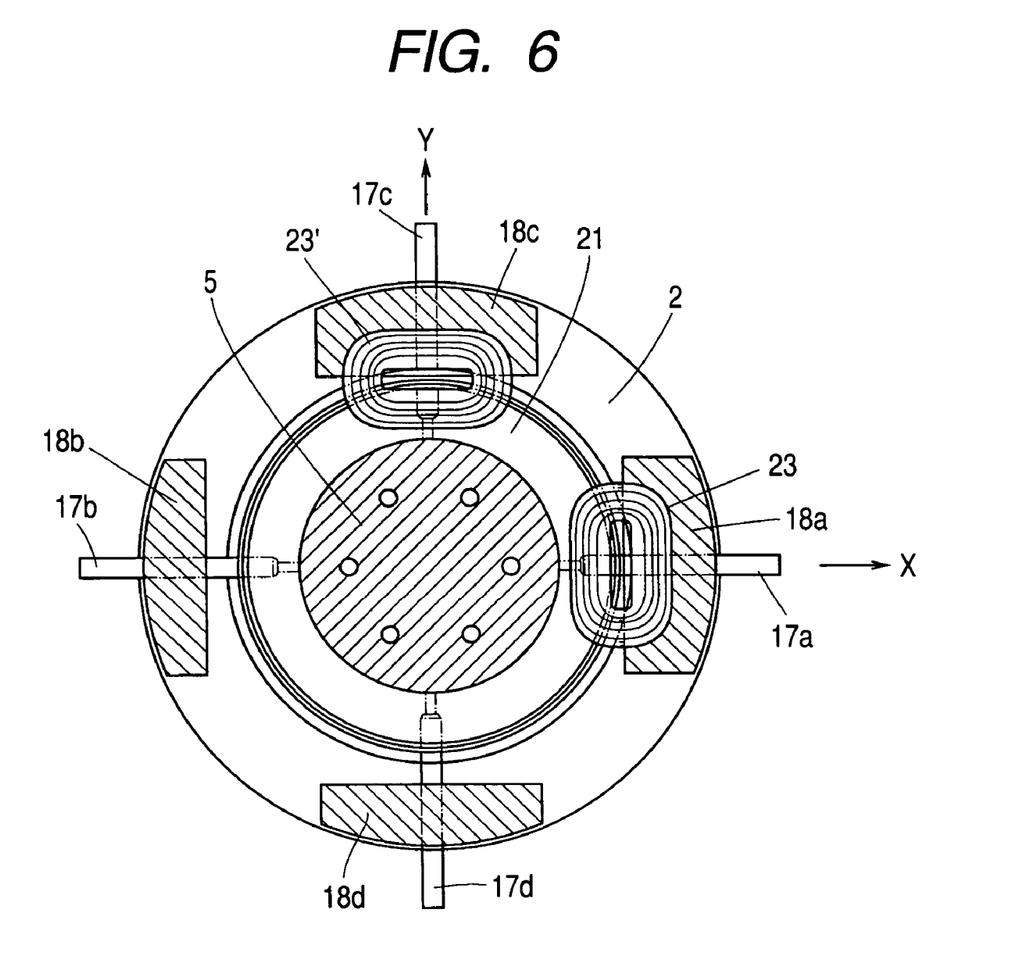
FIG. 6 is a cross sectional view taken along a line 6—6 of FIG. 5.

FIG. 5 is a cross sectional view of Embodiment 2 of the present invention, and FIG. 6 is a cross sectional view taken along a line 6—6 of FIG. 5. A total of four positional sensors are used in Embodiment 2, two each in X-axis and Y-axis directions. The positional sensors 17a and 17b, and positional sensors 17c and 17d, are attached on the fixing portions 18a and 18b, and on fixing portions 18c and 18d, respectively. Deviations in the X-axis direction and in the Y-axis direction are thus detected. Further, an electromagnetic coil 23' is disposed on the fixing portion 18c, on the Y-axis perpendicular to the electromagnetic coil 23 on the X-axis shaft.

It therefore becomes possible in Embodiment 2 to correct deviations in the radial direction separately for the X-axis direction and the Y-axis direction by using the electromagnetic coils 23 and 23'.

Embodiment 3

Figure 7:
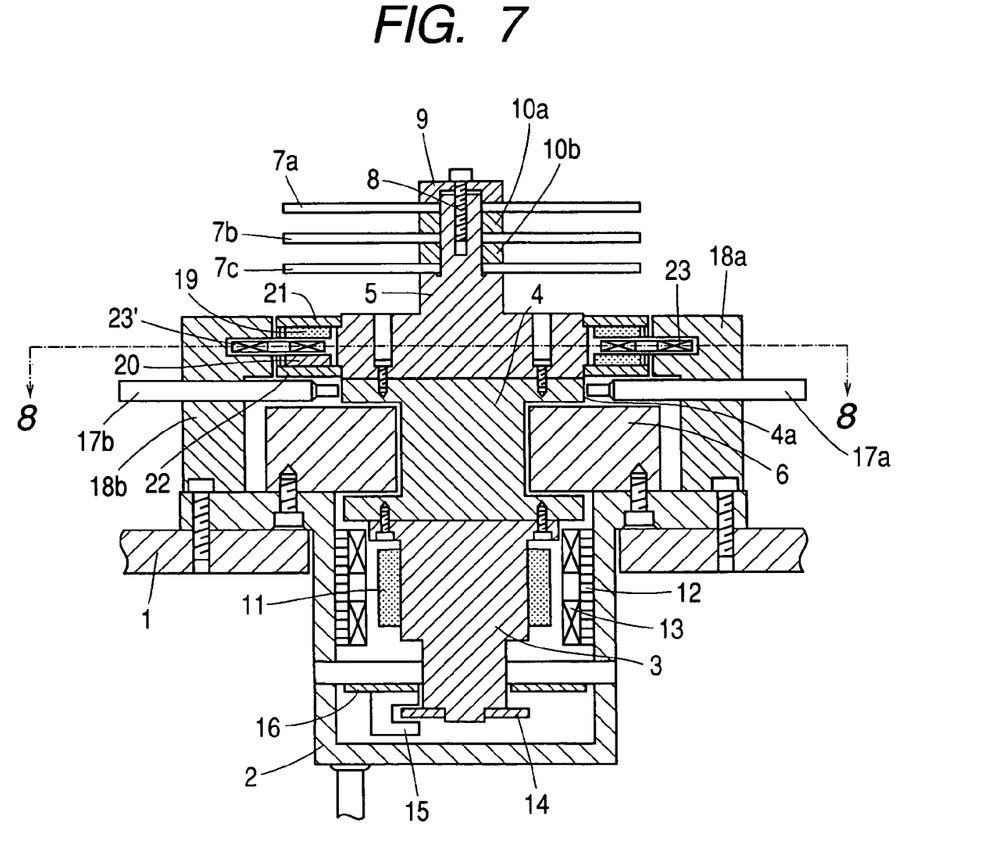
FIG. 7 is a cross sectional view of Embodiment 3 of the present invention.
Figure 8:
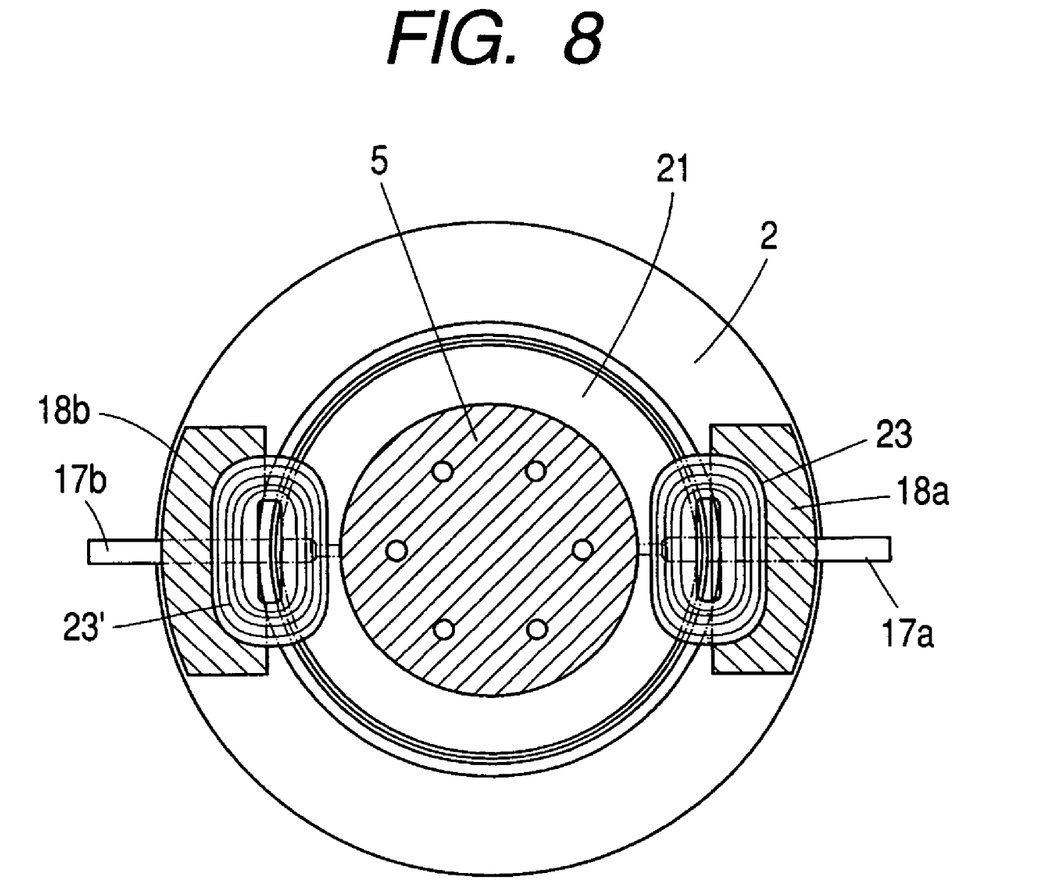
FIG. 8 is a cross sectional view taken along a line 8—8 of FIG. 7.

FIG. 7 is a cross sectional view of Embodiment 3 of the present invention, and FIG. 8 is a cross sectional view taken along a line 8—8 of FIG. 7. Taking into account displacements due to minute thermal expansion in the vicinity of the electromagnetic coil 23 caused by temperature increases at the electromagnetic coil 23 serving as a force generating means in Embodiment 1, another electromagnetic coil 23' is disposed on the fixing portion 18b in a position symmetrically opposite to the electromagnetic coil 23.

Inputs to the electromagnetic coils 23 and 23' at this point have a push-pull relationship, and are in a laterally symmetrical relationship both thermally and dynamically, so that canceling minute deformation due to thermal expansion. True shaft movement amounts can thus be more precisely detected, and deviations thereof can be reduced.

Embodiment 4

Figure 9:
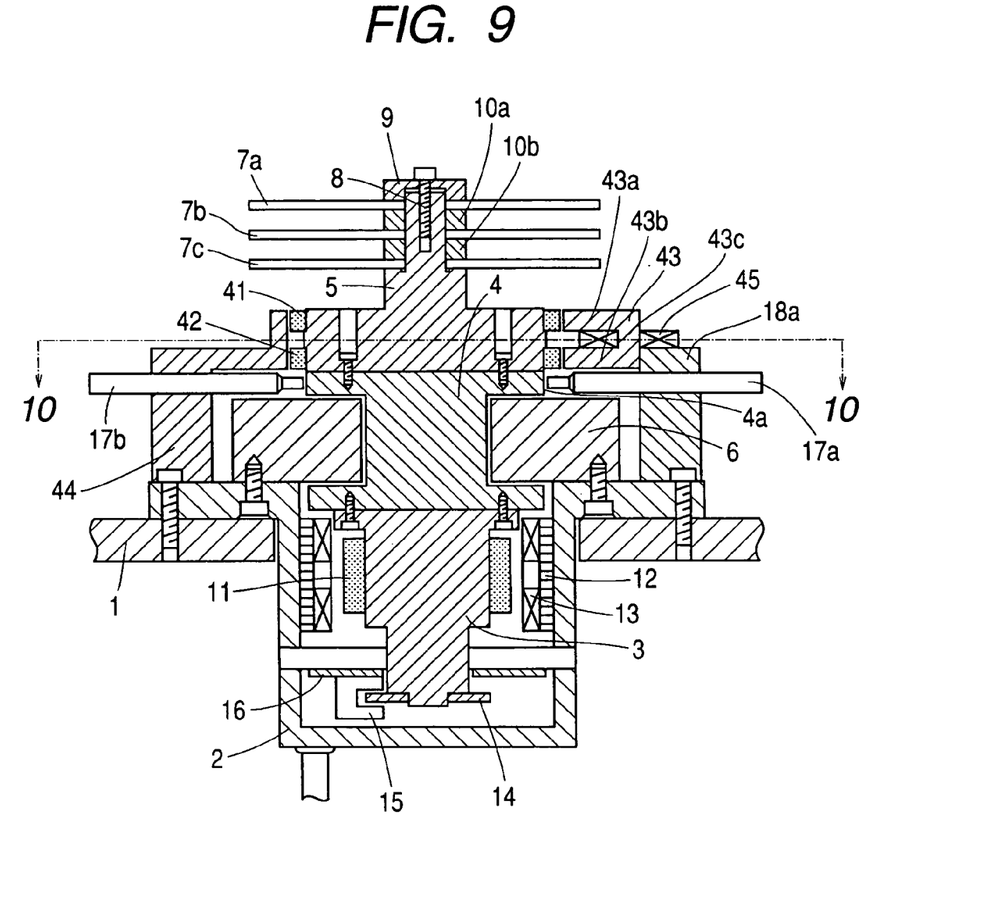
FIG. 9 is a cross sectional view of Embodiment 4 of the present invention.
Figure 10:
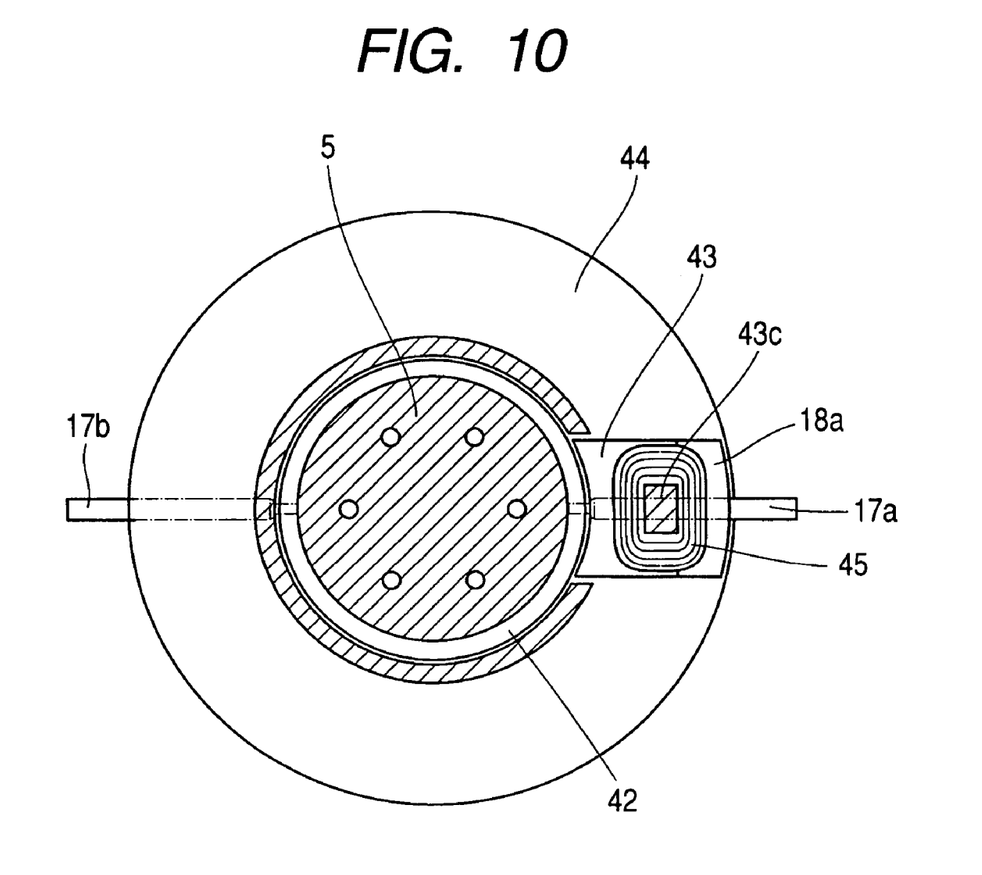
FIG. 10 is a cross sectional view taken along a line 10—10 of FIG. 9.

FIG. 9 is a cross sectional view of Embodiment 4 of the present invention, and FIG. 10 is a cross sectional view taken along a line 10—10 of FIG. 9. A different form of force generating means is used in Embodiment 4 compared to that used in Embodiment 1. In the force generating means according to Embodiments 1 to 3, the electromagnetic coil 23 is inserted into the air gap in which the magnetic field is formed in the axial direction, thus generating force. In Embodiment 4, however, an air gap is formed in the radial direction, and a radial magnetic field is formed within the air gap.

That is, an annular magnet 41 whose entire circumference is magnetized to N, and an annular magnet 42 disposed below the annular magnet 41 and whose entire circumference is magnetized to S are fixed to the hub 5 while being spaced apart from each other. Yokes 43 and 44, which form a magnetic path over the entire circumference thereof together with the magnets 41 and 42, are disposed integrally with the fixing portion 18a on the housing 2 in the periphery of the magnets 41 and 42. Further, a pair of circular arc-shaped yokes 43a and 43b are provided to the yoke 43, opposing outer circumferences of the magnets 41 and 42, respectively, through air gaps. Wirings of an electromagnetic coil 45 are wound around a core 43 between the yokes 43a and 43b.

In Embodiment 4, the positional sensor 17a is fixed to the fixing portion 18, and the other positional sensor 17b is fixed to the yoke 44. A force is thus generated in a radical direction when electric current flows through the electromagnetic coil 45. By changing the gap between the windings, good control of deviations in the radial direction can be performed.

The magnet 42 may be omitted also in Embodiment 4. By giving the hub 5 or by forming an air gap with the yoke 43b being a similar configuration, the entire thickness of the magnets can be reduced by approximately half.

Embodiment 5

Figure 11:
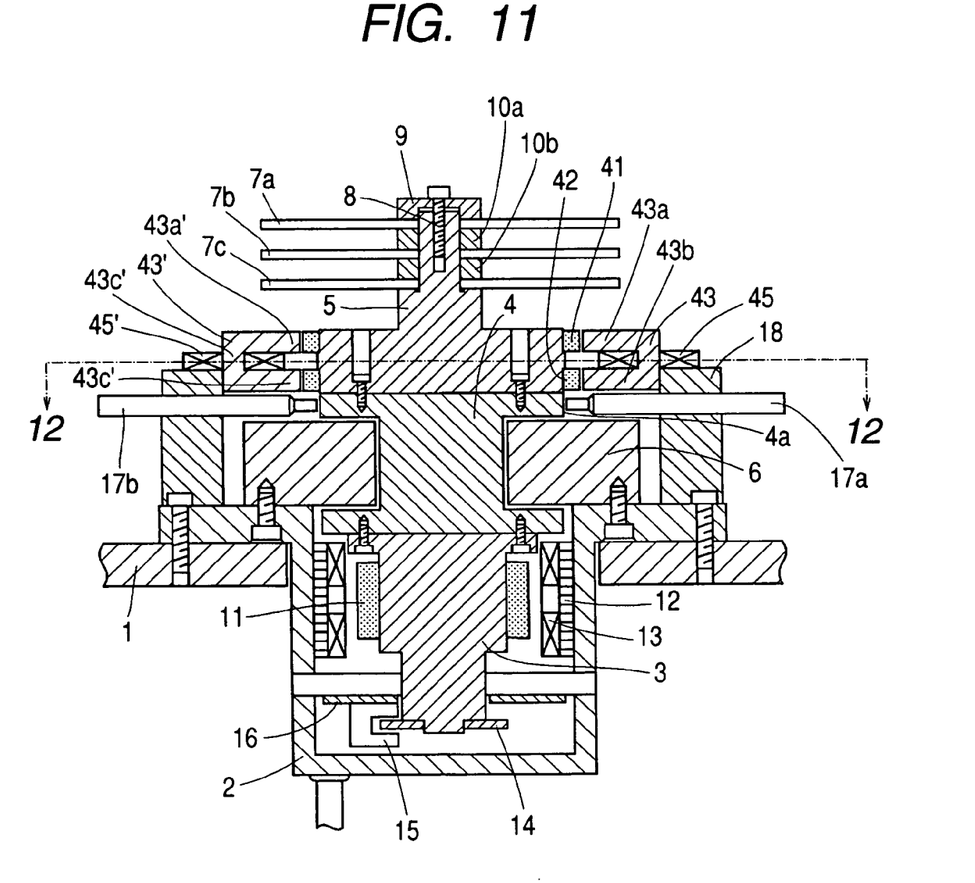
FIG. 11 is a cross sectional view of Embodiment 5 of the present invention.
Figure 12:
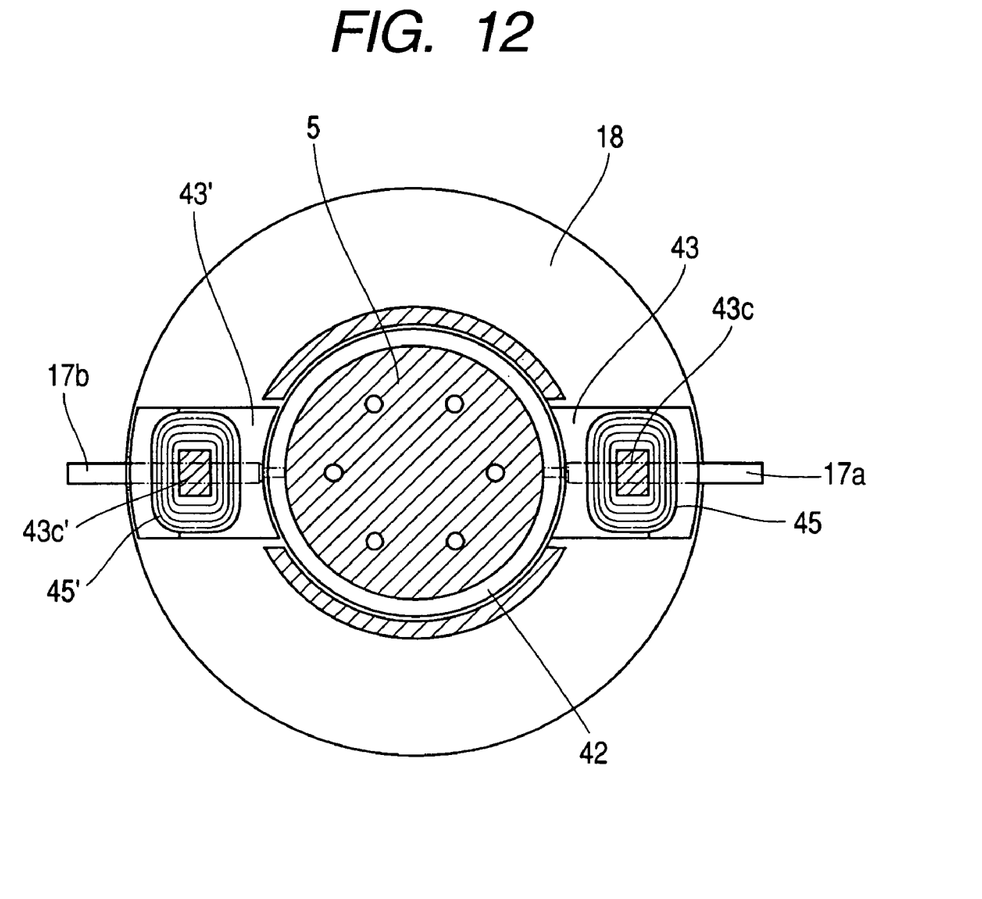
FIG. 12 is a cross sectional view taken along a line 12—12 of FIG. 11.

FIG. 11 is a cross sectional view of Embodiment 5 of the present invention, and FIG. 12 is a cross sectional view taken along a line 12—12 of FIG. 11. Force generating means including a yoke 43' and an electromagnetic coil 45', similar to the yoke 43 and the electromagnetic coil 45 of Embodiment 4 respectively, is disposed on a side radically opposite to the force generating means of Embodiment 4. Further, the fixing portion 18 integrated therewith across the entire circumference is disposed in order to close off magnetic path of the magnets 41 and 42, thus also establishing a yoke function.

The electromagnetic coils 45 and 45' configure a push-pull circuit in Embodiment 5, and therefore effects similar to those of Embodiment 3 can be obtained.

Embodiment 6

Figure 13:
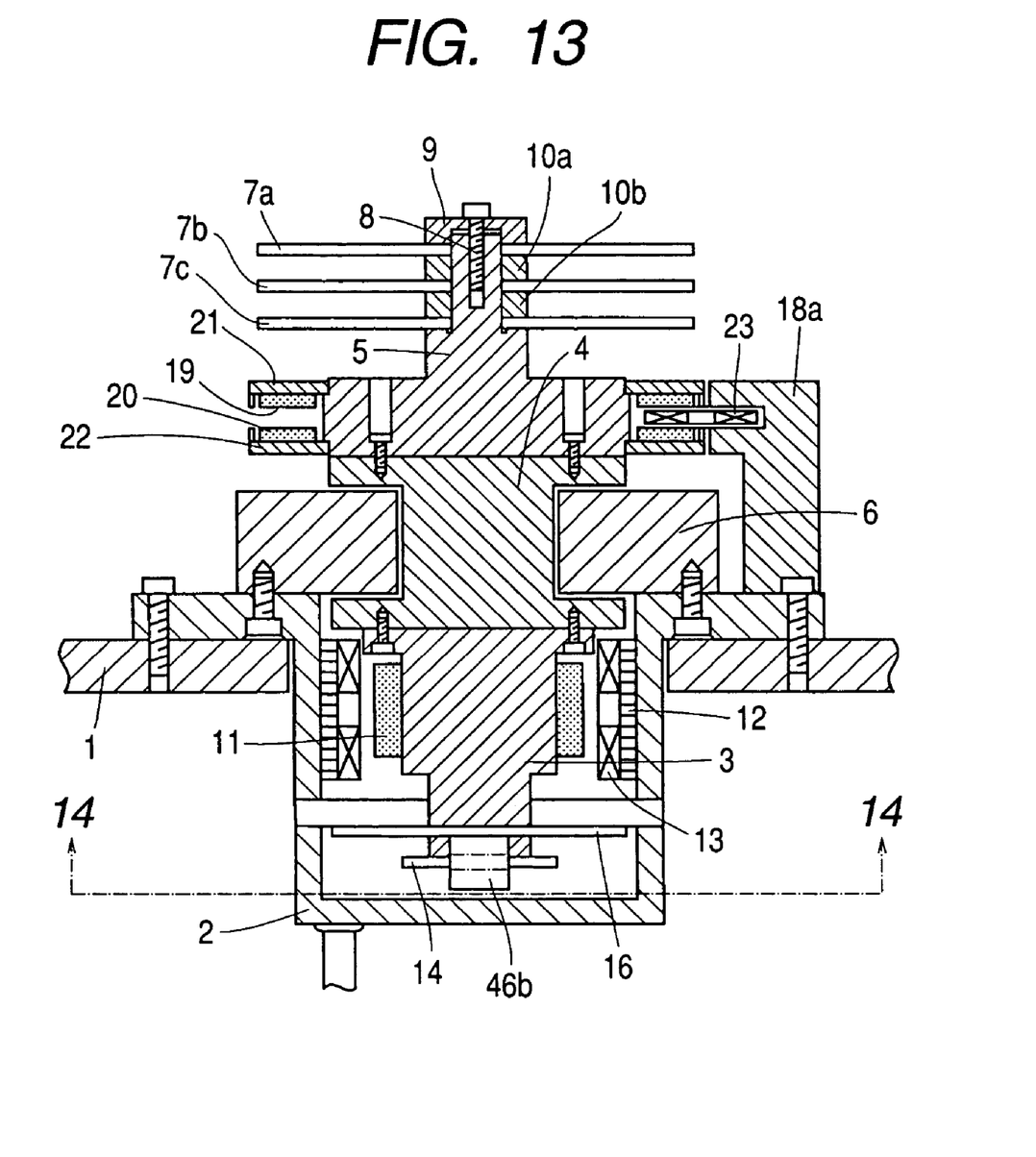
FIG. 13 is a cross sectional view of Embodiment 6 of the present invention.
Figure 14:
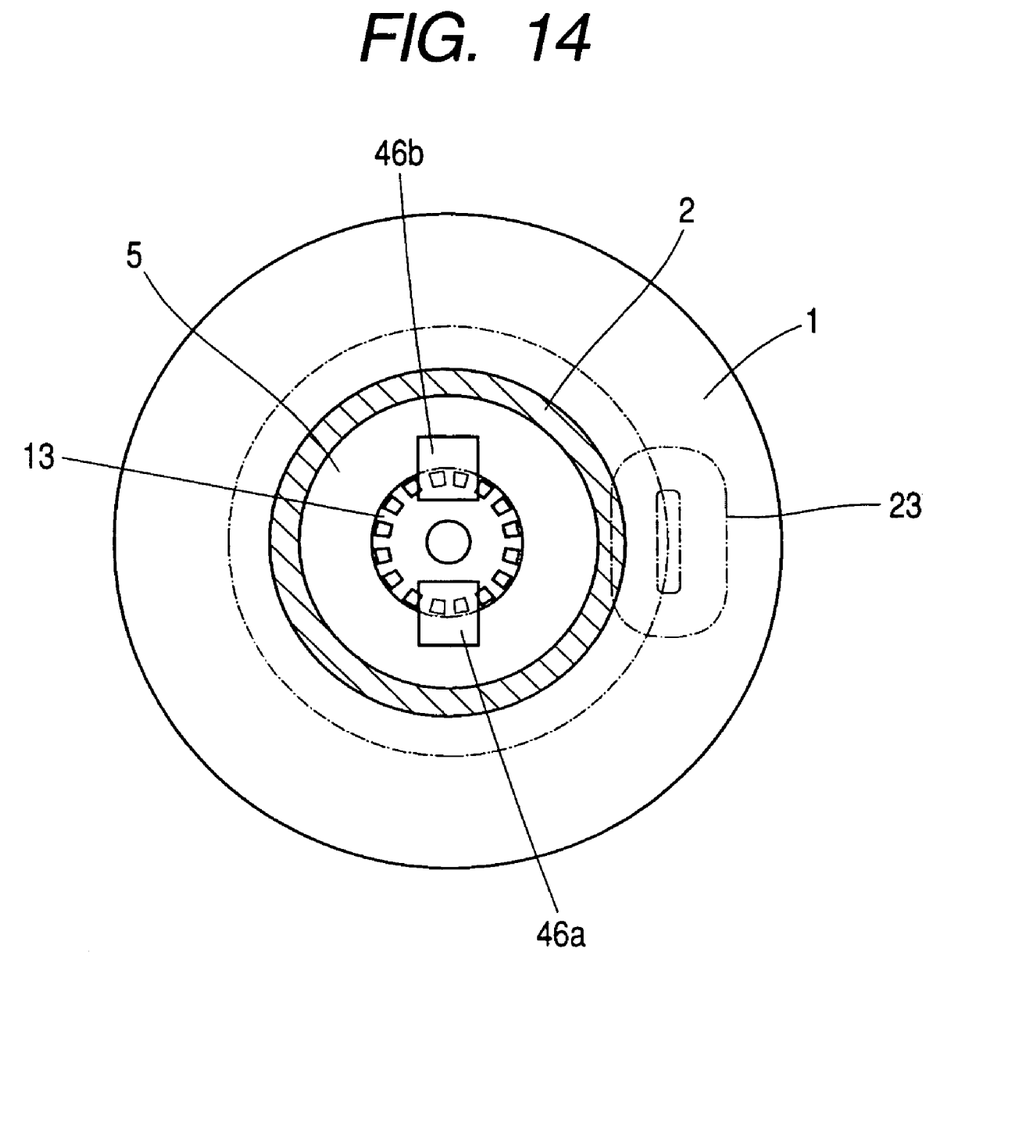
FIG. 14 is a cross sectional view taken along a line 14—14 of FIG. 13.

FIG. 13 is a cross sectional view of Embodiment 6 of the present invention, and FIG. 14 is a cross sectional view taken along a line 14—14 of FIG. 13. A pair of encoder heads 46a and 46b are used in Embodiment 6 in place of the pair of positional sensors 17a and 17b of Embodiment 1.

That is, the chart 14 is fixed to the lower end of the rotation drive portion 3, and the two encoder heads 46a and 46b that detect position signals of the chart 14 are fixed to the housing 2, through the circuit substrate 16, at a spacing of 180°. A straight line connecting the encoder heads 46a and 46b extends in an orthogonal direction with respect to an urging direction of the force imparted by the magnetic coil 23.

The differential component of the position signals read by the encoder heads 46a and 46b coincides with a direction of a motion, which is orthogonal to the straight line connecting the encoder heads 46a and 46b; among the motions of the shaft center of the rotation driving portion 3. That is, the differential component coincides with the urging direction of the force imparted by the force generating means. Deviations can therefore be controlled by the differential composition of the outputs of the encoder heads 46a and 46b.

Embodiment 7

Figure 15:
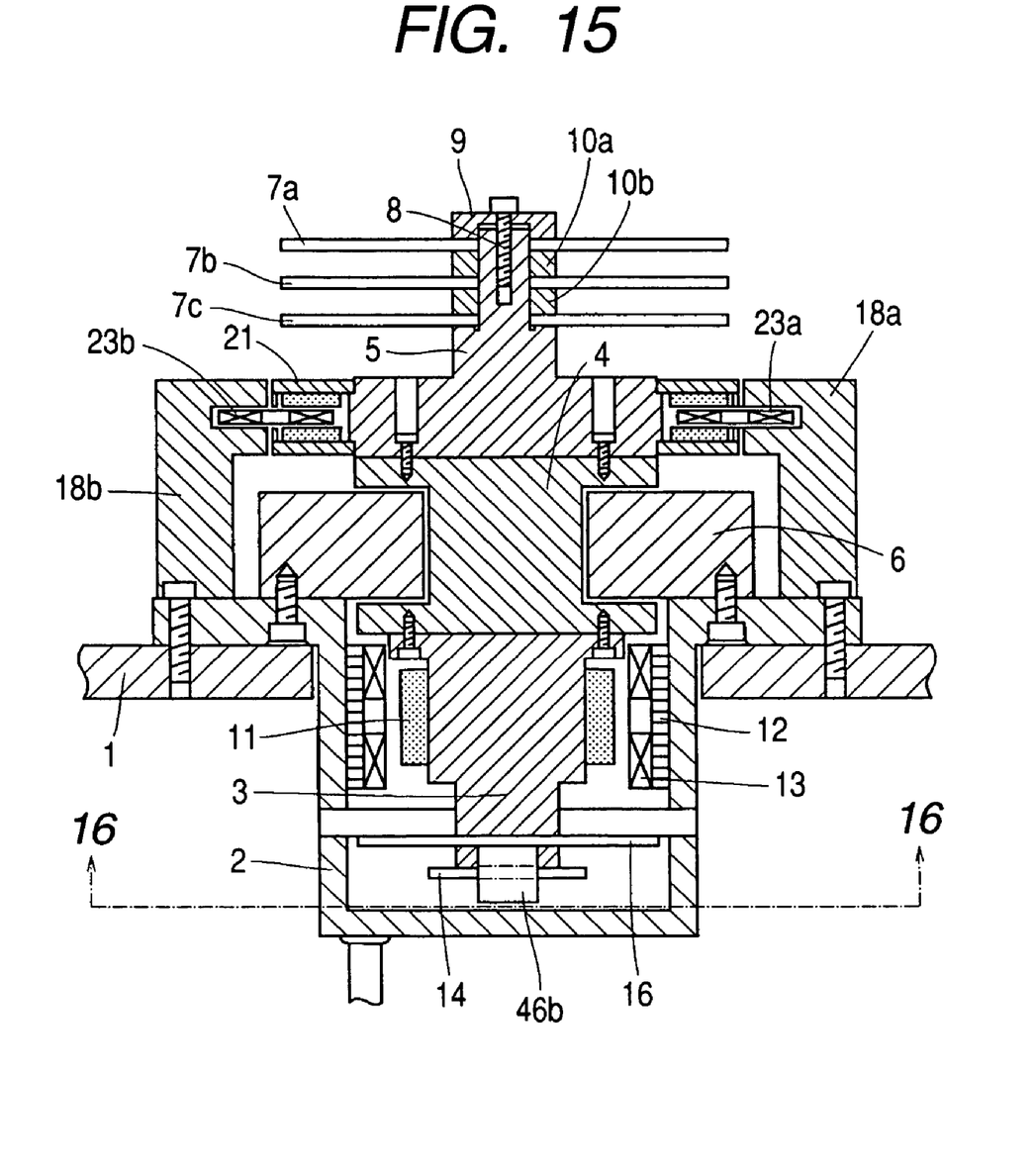
FIG. 15 is a cross sectional view of Embodiment 7 of the present invention.
Figure 16:
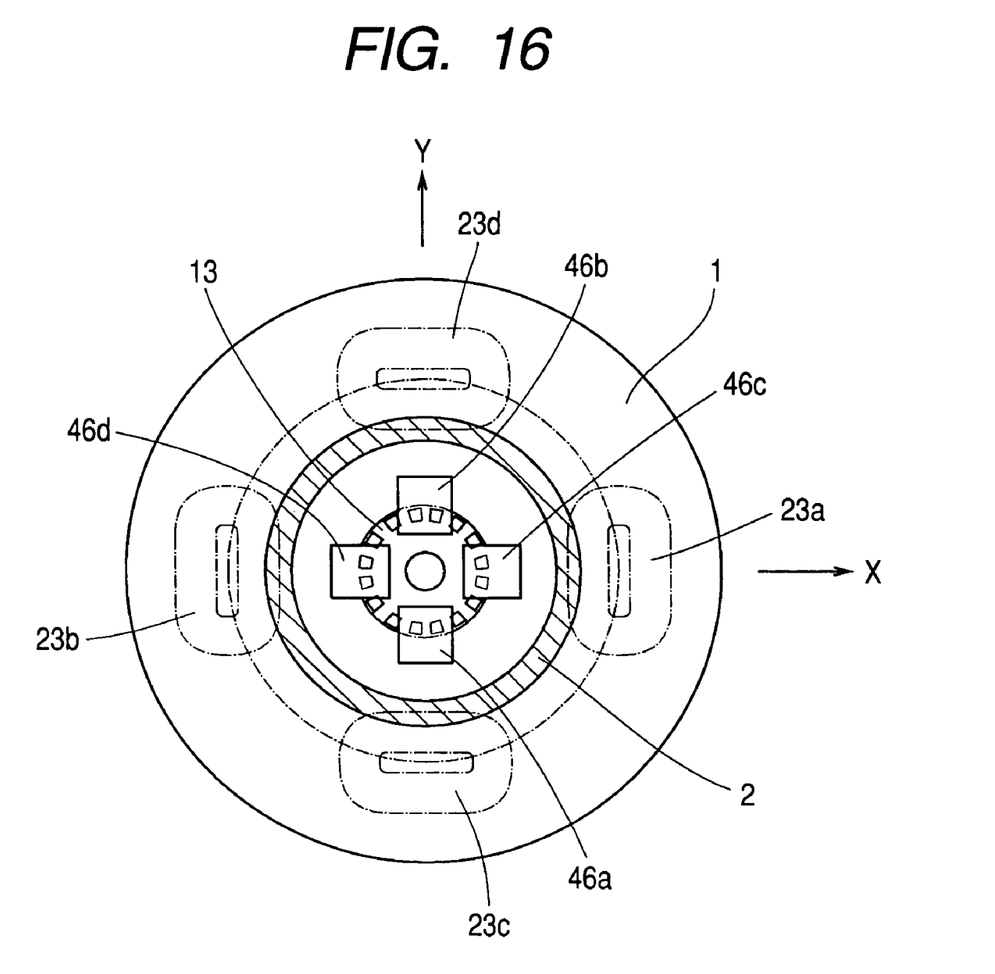
FIG. 16 is a cross sectional view taken along a line 16—16 of FIG. 15.

FIG. 15 is a cross sectional view of Embodiment 7 of the present invention, and FIG. 16 is a cross sectional view taken along a line 16—16 of FIG. 15. In Embodiment 6 the encoder heads 46a and 46b are provided in only one direction. In Embodiment 7, however, four encoder heads 46a to 46d are provided, two opposing encoder heads in the X-axis direction and the other two opposing encoder heads in the Y-axis direction. In addition, electromagnetic coils 23a, 23b, 23c, and 23d are disposed in four directions.

Deviations in the X-axis direction and in the Y-axis direction can thus be more accurately detected, and can be controlled in a favorable manner.

This application claims priority from Japanese Patent Application No. 2003-366854 filed on Oct. 28, 2003, which is hereby incorporated by reference herein.

What is claimed is:

1. A bearing device comprising:
   a stator portion that rotatably supports a rotor portion;
   a deviation detection unit that detects deviations of the rotor portion in a radial direction;
   force generating means for applying a force to the rotor portion in the radial direction; and
   controlling means for controlling the force generating means based on an output from the deviation detection unit so as to eliminate the deviations of the rotor portion in the radial direction;
   wherein the deviation detection unit comprises a chart disposed in the rotor portion, and encoder heads for detecting a position of the chart at at least a pair of positions of the stator portion with respect to a rotation center of the rotor portion, and wherein the deviation detection unit detects deviations of the rotor portion in a direction orthogonal to a straight line connecting the encoder heads to each other by differential outputs of the pair of encoder heads.

2. A hard disk drive servo-writer comprising the bearing device according to claim 1.

* * * * *